United States Patent
Ogata et al.

(10) Patent No.: US 10,522,809 B2
(45) Date of Patent: Dec. 31, 2019

(54) ADHESIVE LAYER, LAYER, AND COMPOSITION

(71) Applicant: SUMITOMO CHEMICAL COMPANY, LIMITED, Chuo-ku, Tokyo (JP)

(72) Inventors: Toshihiko Ogata, Osaka (JP); Chikara Murakami, Osaka (JP)

(73) Assignee: SUMITOMO CHEMICAL COMPANY, LIMITED, Chuo-ku, Tokyo (JP)

(*) Notice: Subject to any disclaimer, the term of this patent is extended or adjusted under 35 U.S.C. 154(b) by 748 days.

(21) Appl. No.: 14/414,822

(22) PCT Filed: Jul. 16, 2013

(86) PCT No.: PCT/JP2013/069719
§ 371 (c)(1),
(2) Date: Jan. 14, 2015

(87) PCT Pub. No.: WO2014/014118
PCT Pub. Date: Jan. 23, 2014

(65) Prior Publication Data
US 2015/0171393 A1    Jun. 18, 2015

(30) Foreign Application Priority Data
Jul. 18, 2012    (JP) .................................. 2012-159299

(51) Int. Cl.
*H01M 2/16*    (2006.01)
*B32B 37/12*    (2006.01)
(Continued)

(52) U.S. Cl.
CPC ......... *H01M 2/168* (2013.01); *B32B 37/1284* (2013.01); *B32B 37/18* (2013.01);
(Continued)

(58) Field of Classification Search
None
See application file for complete search history.

(56) References Cited

U.S. PATENT DOCUMENTS

| | | | |
|---|---|---|---|
| 6,051,342 A | 4/2000 | Hamano et al. | |
| 6,232,014 B1 | 5/2001 | Shiota et al. | |
| | (Continued) | | |

FOREIGN PATENT DOCUMENTS

| | | |
|---|---|---|
| EP | 0973223 A1 | 1/2000 |
| JP | 10-177865 A | 6/1998 |
| | (Continued) | |

OTHER PUBLICATIONS

Satsuma et al. JP 2004-241172 A, machine translation.*
(Continued)

*Primary Examiner* — Wojciech Haske
(74) *Attorney, Agent, or Firm* — Sughrue Mion, PLLC

(57) ABSTRACT

An adhesive layer disposed between a separator for a secondary battery and an electrode for a secondary battery, wherein the adhesive layer is obtained by bonding under pressure a layer containing a resin having a structural unit derived from an α-olefin having 2 to 4 carbon atoms, and an occupancy area of the resin in the adhesive layer is 10 to 80%.

2 Claims, 1 Drawing Sheet

(51) Int. Cl.
*B32B 37/18* (2006.01)
*B32B 38/00* (2006.01)
*B32B 38/16* (2006.01)

(52) U.S. Cl.
CPC ...... *B32B 38/164* (2013.01); *B32B 2038/168* (2013.01); *B32B 2457/10* (2013.01)

(56) References Cited

U.S. PATENT DOCUMENTS

| | | | |
|---|---|---|---|
| 6,589,690 | B1 | 7/2003 | Sato et al. |
| 2003/0072999 | A1 | 4/2003 | Birke et al. |
| 2003/0157408 | A1 | 8/2003 | Sun |
| 2004/0053122 | A1* | 3/2004 | Sugiyama ........... H01M 2/1653 429/144 |
| 2006/0105245 | A1 | 5/2006 | Ikuta et al. |
| 2014/0227603 | A1 | 8/2014 | Ogata |
| 2014/0242470 | A1 | 8/2014 | Ogata |

FOREIGN PATENT DOCUMENTS

| | | |
|---|---|---|
| JP | 2000-106167 A | 4/2000 |
| JP | 2000-348776 A | 12/2000 |
| JP | 2002-015773 A | 1/2002 |
| JP | 2003-086233 A | 3/2003 |
| JP | 2003-151638 A | 5/2003 |
| JP | 2003-163033 A | 6/2003 |
| JP | 2004-2658 A | 1/2004 |
| JP | 2004-241172 A | 8/2004 |
| JP | 2005-60485 A | 3/2005 |
| JP | 2005-285372 A | 10/2005 |
| JP | 2011-23186 A | 2/2011 |
| JP | 2011-54502 A | 3/2011 |
| JP | 2011-54503 A | 3/2011 |
| KR | 1020060095368 A | 8/2006 |
| KR | 1020070077231 A | 7/2007 |
| WO | 99/26307 A1 | 5/1999 |
| WO | 99/40645 A1 | 8/1999 |
| WO | 2005/124899 A1 | 12/2005 |
| WO | 2013/047853 A1 | 4/2013 |
| WO | 2013/047856 A1 | 4/2013 |

OTHER PUBLICATIONS

Rico et al. Langmuir 2009, 25(17), 9785-9791.*
Written Opinion of the International Searching Authority for PCT/JP2013/069719 dated Oct. 22, 2013.
International Search Report of PCT/JP2013/069719 dated Oct. 22, 2013.
Machine translation of JP 2002-015773 A, published Jan. 18, 2002.
Machine translation of JP 2000-106167 A, published Apr. 11, 2000.
Machine translation of JP 2003-086233 A, published Mar. 20, 2003.

* cited by examiner

ADHESIVE LAYER, LAYER, AND COMPOSITION

CROSS REFERENCE TO RELATED APPLICATIONS

This application is a National Stage of International Application No. PCT/JP2013/069719, filed Jul. 16, 2013, claiming priority based on Japanese Patent Application No. 2012-159299, filed Jul. 18, 2012, the contents of all of which are incorporated herein by reference in their entirety.

TECHNICAL FIELD

The present invention relates to an adhesive layer, a layer, and a composition.

BACKGROUND ART

As a member for a secondary battery, a member obtained by laminating an electrode and a separator without an adhesive layer interposed therebetween has been known (Non-patent Document 1).

PRIOR ART DOCUMENT

Non-Patent Document

Non-patent Document 1: "Lithium Ion Secondary Battery 2nd Edition-Materials and Applications—," edited by Masayuki Yoshio/Akiya Ozawa, Nikkan Kogyo Shimbun Ltd., August 2001, pp. 173 to 177

SUMMARY OF THE INVENTION

Problems to be Solved by the Invention

In the conventional member for a secondary battery, a deviation is likely to occur between the electrode and the separator, and workability in assembly of a battery may not be necessarily satisfactory.

Means for Solving the Problems

The present invention includes the following aspects.

[1] An adhesive layer disposed between a separator for a secondary battery and an electrode for a secondary battery, wherein
the adhesive layer is obtained by bonding under pressure a layer containing a resin having a structural unit derived from an α-olefin having 2 to 4 carbon atoms, and
an occupancy area of the resin in the adhesive layer is 10 to 80%.

[2] The adhesive layer according to [1], wherein the adhesive layer contains the resin having a structural unit derived from an α-olefin having 2 to 4 carbon atoms in an amount of 0.001 to 1 g/m$^2$.

[3] The adhesive layer according to [1] or [2], wherein the resin having a structural unit derived from an α-olefin having 2 to 4 carbon atoms has a lowest film-forming temperature of 40 to 150° C.

[4] The adhesive layer according to any one of [1] to [3], further comprising a nonionic surfactant.

[5] A layer for bonding a separator for a secondary battery and an electrode for a secondary battery to each other, wherein
the layer comprises a resin having a structural unit derived from an α-olefin having 2 to 4 carbon atoms, and
the occupancy area of the resin in the layer is 10 to 80%.

[6] The layer according to [5], wherein the layer contains the resin having a structural unit derived from an α-olefin having 2 to 4 carbon atoms in an amount of 0.001 to 1 g/m$^2$.

[7] The layer according to [5] or [6], wherein the resin having a structural unit derived from an α-olefin having 2 to 4 carbon atoms has a lowest film-forming temperature of 40 to 150° C.

[8] The layer according to any one of [5] to [7], further comprising a nonionic surfactant.

[9] A composition for bonding a separator for a secondary battery and an electrode for a secondary battery to each other, wherein
the composition comprises a resin having a structural unit derived from an α-olefin having 2 to 4 carbon atoms, an organic solvent having a boiling point of 100 to 300° C., and water.

[10] The composition according to [9], further comprising a surfactant.

[11] The composition according to [9] or [10], further comprising an alcohol having a boiling point of lower than 100° C.

[12] The composition according to any one of [9] to [11], wherein the composition is an emulsion.

[13] The composition according to [12], wherein dispersoids contained in the emulsion have a number average particle diameter of 0.3 to 2 μm.

[14] The composition according to [12] or [13], wherein dispersoids contained in the emulsion have a particle diameter standard deviation of 0.5 or less.

[15] The composition according to any one of [12] to [14], wherein the ratio of the number of dispersoids having a particle diameter of less than 0.6 μm to the number of all the dispersoids contained in the emulsion is less than 10%.

[16] The composition according to any one of [9] to [15], wherein the solid content ratio of the composition is 0.001 to 50% by mass.

[17] An adhesive layer disposed between a separator for a secondary battery and an electrode for a secondary battery, wherein the adhesive layer is formed of the composition according to any one of [9] to [16].

[18] A layer for forming an adhesive layer disposed between a separator for a secondary battery and an electrode for a secondary battery, wherein the layer is formed of the composition according to any one of [9] to [16].

[19] A laminate comprising the layer according to any one of [5] to [8], and a separator for a secondary battery or an electrode for a secondary battery.

[20] A method for producing a laminate, comprising a step of applying the composition according to any one of [9] to [16] to a separator for a secondary battery or an electrode for a secondary battery.

[21] A member for a secondary battery, the member comprising the adhesive layer according to any one of [1] to [4], a separator for a secondary battery, and an electrode for a secondary battery.

[22] A method for producing a member for a secondary battery, the member having a separator for a secondary battery, an adhesive layer, and an electrode for a secondary battery in order, the method comprising steps of:
(a) applying the composition according to any one of [9] to [16] to a separator for a secondary battery;
(b) drying the applied composition to obtain a laminate comprising a layer and the separator for a secondary battery; and (c) bonding under pressure the layer and an electrode for a secondary battery to each other.

[23] A method for producing a member for a secondary battery, the member having an electrode for a secondary battery, an adhesive layer, and a separator for a secondary battery in order, the method comprising steps of:

(a) applying the composition according to any one of [9] to [16] to an electrode for a secondary battery;

(b) drying the applied composition to obtain a laminate comprising a layer and the electrode for a secondary battery; and (c) bonding under pressure the laminate and a separator for a secondary battery to each other.

Effect of the Invention

According to the adhesive layer of the present invention, a separator for a secondary battery and an electrode for a secondary battery included in a member for a secondary battery can be bonded to each other at sufficient strength, and workability in assembly of a secondary battery can be improved.

MODE FOR CARRYING OUT THE INVENTION

<Adhesive Layer>

Figure 1:
FIG. 1 is a schematic view illustrating a cross-sectional structure of a laminate.

The adhesive layer of the present invention (herein may be referred to as "the adhesive layer") is disposed between a separator for a secondary battery (herein may be referred to as "separator") and an electrode for a secondary battery (herein may be referred to as "electrode"). The adhesive layer is obtained by bonding under pressure a layer containing a resin having a structural unit derived from an α-olefin having 2 to 4 carbon atoms (herein may be referred to as "resin A"). The occupancy area of the resin A in the adhesive layer is 10 to 80%. Such an adhesive layer is used to bond the separator and the electrode.

(Separator)

The separator generally has microscopic pores. Examples of the separator include paper of viscose rayon, natural cellulose and the like; mixed paper obtained by paper-making of fibers of cellulose, polyester and the like; electrolytic paper; kraft paper; Manila paper; a polyethylene non-woven fabric, a polypropylene non-woven fabric, a polyester non-woven fabric, glass fibers, porous polyolefin (e.g., porous polyethylene and porous polypropylene), porous polyester, aramid fibers, a polybutylene terephthalate non-woven fabric, a para-oriented wholly aromatic polyamide, a non-woven fabric or porous membrane of a fluorine-containing resin such as polyvinylidene fluoride, tetrafluoroethylene, a copolymer of vinylidene fluoride and propylene hexafluoride and fluorine-containing rubber; a membrane of a proton conduction polymer; and the like. Electrolytic paper, paper of viscose rayon or natural cellulose, mixed paper obtained by paper-making of fibers of cellulose and polyester, kraft paper, Manila paper, a polyethylene non-woven fabric, a polypropylene non-woven fabric, a polyester non-woven fabric, a Manila hemp sheet, a glass fiber sheet, porous polyolefin, and porous polyester are preferred. Porous polyolefin and porous polyester are more preferred.

The pore diameter of the microscopic pore of the separator is generally 0.01 to 10 µm. The thickness of the separator is generally 1 to 300 µm, and preferably 5 to 30 µm.

The separator may be a laminated film obtained by laminating films having different porosities. In particular, a laminated film obtained by laminating porous polyolefin and porous polyester is suitable.

The separator may be a heat-resistant laminated film obtained by further laminating a heat-resistant layer on the film or the laminated film.

Examples of the heat-resistant layer include heat-resistant layers containing a fluorine-based polymer such as polyvinylidene fluoride; a polyamide or polyimide polymer such as polyamide 6, polyamide 66, polyamide 11, polyamide 12, an aromatic polyamide, and a polyimide; filler particles, and the like. The separator may have one heat-resistant layer or two or more kinds of heat-resistant layers.

Examples of the filler particles include inorganic fine particles and organic fine particles.

Examples of the inorganic fine particles include fine particles containing calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, glass and the like.

Examples of the organic fine particles include fine particles containing homopolymers of styrene, vinyl ketone, acrylonitrile, methyl methacrylate, ethyl methacrylate, glycidyl methacrylate, glycidyl acrylate, methyl acrylate and the like, or copolymers of two or more thereof; fluorine-based resins such as polytetrafluoroethylene, an ethylene tetrafluoride-propylene hexafluoride copolymer, an ethylene tetrafluoride-ethylene copolymer, and polyvinylidene fluoride; a melamine resin; an urea resin; polyethylene; polypropylene; polymethacrylate, and the like. Two or more kinds of fine particles or identical kind of fine particles having different particle size distributions may be mixed to give filler particles.

(Electrode)

The electrode includes a positive electrode and a negative electrode for a secondary battery. The electrode is generally obtained by applying an electrode active material and if necessary, a conductive material to at least one surface of a current collector via a binder.

Examples of the electrode active material include an active material capable of occluding and releasing lithium ions. The electrode active material includes a positive electrode active material and a negative electrode active material.

Examples of the positive electrode active material include metal composite oxides containing at least one kind of metal selected from the group consisting of lithium, iron, cobalt, nickel and manganese, and the like. A positive electrode active material containing $Li_xMO_2$ (wherein M represents one or more transition metals, and preferably at least one of Co, Mn, and Ni, and $1.10>x>0.05$) or $Li_xM_2O_4$ (wherein M represents one or more transition metals, and preferably Mn, and $1.10>x>0.05$) is preferred. Specific examples thereof include positive electrode active materials represented by $LiCoO_2$, $LiNiO_2$, $Li_xNi_yCo_{(1-y)}O_2$ (wherein $1.10>x>0.05$ and $1>y>0$), and $LiMn_2O_4$; and the like.

Examples of the negative electrode active material include various silicon oxides (e.g., $SiO_2$), carbonaceous substances, metal composite oxides, and the like. Preferable examples thereof include carbonaceous materials such as amorphous carbon, graphite, natural graphite, MCMB, pitch-based carbon fibers, and polyacene; and metal composite oxides represented by $A_xM_yO_z$ (wherein A represents Li, M represents at least one selected from Co, Ni, Al, Sn, and Mn, O represents an oxygen atom, and x, y, and z are numbers in a range of $1.10 \geq x \geq 0.05$, $4.00 \geq y \geq 0.85$, and $5.00 \geq z \geq 1.5$, respectively).

Examples of the conductive material include conductive carbons such as graphite, carbon black, acetylene black, Ketjen black, and active carbon; graphite type conductive materials such as natural graphite, thermally expanded graphite, scaly graphite, and expanded graphite; carbon fibers such as vapor-grown carbon fibers; metal fine particles and metal fibers of aluminum, nickel, copper, silver, gold, and platinum; conductive metal oxides such as ruthenium oxide and titanium oxide; conductive polymers such as polyaniline, polypyrrole, polythiophene, polyacetylene, and polyacene; and the like.

Carbon black, acetylene black, and Ketjen black are preferred since the conductivity is effectively improved by a small amount thereof.

The content of the conductive material is preferably 0 to 50 parts by mass, and more preferably 0 to 30 parts by mass with respect to 100 parts by mass of the electrode active material.

Examples of a material for the current collector include metals such as nickel, aluminum, titanium, copper, gold, silver, platinum, an aluminum alloy, and stainless steel; those formed by plasma spraying or arc spraying nickel, aluminum, zinc, copper, tin, lead, or an alloy thereof on a carbon material or activate carbon fiber; conductive films obtained by dispersing a conductive material in rubber or a resin such as a styrene-ethylene-butylene-styrene copolymer (SEBS); and the like.

Examples of a shape of the collector include a foil shape, a flat-plate shape, a mesh shape, a net shape, a lath shape, a punching shape, an emboss shape, a combination thereof (e.g., mesh-shaped flat plate), and the like.

The current collector may have an irregular surface formed by an etching treatment.

Examples of the binder include fluorine-based polymers such as polyvinylidene fluoride;
diene-based polymers such as polybutadiene, polyisoprene, an isoprene-isobutylene copolymer, natural rubber, a styrene-1,3-butadiene copolymer, a styrene-isoprene copolymer, a 1,3-butadiene-isoprene-acrylonitrile copolymer, a styrene-1,3-butadiene-isoprene copolymer, a 1,3-butadiene-acrylonitrile copolymer, a styrene-acrylonitrile-1,3-butadiene-methyl methacrylate copolymer, a styrene-acrylonitrile-1,3-butadiene-itaconic acid copolymer, a styrene-acrylonitrile-1,3-butadiene-methyl methacrylate-fumaric acid copolymer, a styrene-1,3-butadiene-itaconic acid-methyl methacrylate-acrylonitrile copolymer, an acrylonitrile-1,3-butadiene-methacrylic acid-methyl methacrylate copolymer, a styrene-1,3-butadiene-itaconic acid-methyl methacrylate-acrylonitrile copolymer, and a styrene-acrylonitrile-1,3-butadiene-methyl methacrylate-fumaric acid copolymer;
olefinic polymers such as an ethylene-propylene copolymer, an ethylene-propylene-diene copolymer, polystyrene, polyethylene, polypropylene, an ethylene-vinyl acetate copolymer, an ethylenic ionomer, polyvinyl alcohol, a vinyl acetate polymer, an ethylene-vinyl alcohol copolymer, chlorinated polyethylene, polyacrylonitrile, polyacrylic acid, polymethacrylic acid, and chlorosulfonated polyethylene;
styrene-based polymers such as a styrene-ethylene-butadiene copolymer, a styrene-butadiene-propylene copolymer, a styrene-isoprene copolymer, a styrene-n-butyl acrylate-itaconic acid-methyl methacrylate-acrylonitrile copolymer, and a styrene-n-butyl acrylate-itaconic acid-methyl methacrylate-acrylonitrile copolymer;
acrylate-based polymers such as polymethyl methacrylate, polymethyl acrylate, polyethyl acrylate, polybutyl acrylate, an acrylate-acrylonitrile copolymer, and 2-ethylhexyl acrylate-methyl acrylate-acrylic acid-methoxy polyethylene glycol monomethacrylate;
polyamide and polyimide polymers such as polyamide 6, polyamide 66, polyamide 11, polyamide 12, aromatic polyamide, and polyimide;
ester-based polymers such as polyethylene terephthalate and polybutylene terephthalate;
cellulose-based polymers such as carboxymethyl cellulose, carboxyethyl cellulose, ethyl cellulose, hydroxymethyl cellulose, hydroxypropyl cellulose, and carboxyethylmethyl cellulose (including ammonium salts thereof and alkali metal salts thereof);
block copolymers such as a styrene-butadiene block copolymer, a styrene-butadiene-styrene block copolymer, a styrene-ethylene-butylene-styrene block copolymer, a styrene-isoprene block copolymer, and a styrene-ethylene-propylene-styrene block copolymer;
an ethylene-vinyl chloride copolymer; an ethylene-vinyl acetate copolymer; a methyl methacrylate polymer; and the like.

(Resin A)

The resin having a structural unit derived from an α-olefin having 2 to 4 carbon atoms (herein may be referred to as "structural unit (α)") may further have a structural unit derived from other monomers that are copolymerizable with the α-olefin having 2 to 4 carbon atoms.

The lowest film-forming temperature of the resin A is preferably 40 to 150° C., more preferably 45 to 120° C., and further preferably 50 to 100° C.

The melting point of the resin A is preferably 40 to 150° C., more preferably 45 to 120° C., and further preferably 50 to 100° C.

Examples of the α-olefin having 2 to 4 carbon atoms may include ethylene, propylene, 1-butene, and the like.

The resin A may contain a structural unit (α) alone or a plurality of kinds of structural units.

It is preferable that the structural unit (α) be a structural unit derived from ethylene.

Examples of the other monomer copolymerizable with the α-olefin include fatty acid vinyl esters such as vinyl acetate, vinyl propionate, vinyl lactate, vinyl laurate, vinyl caproate, vinyl stearate, vinyl palmitate, and vinyl versatate;
acrylic acid esters having an alkyl group having 1 to 16 carbon atoms such as methyl acrylate, ethyl acrylate, propyl acrylate, butyl acrylate, hexyl acrylate, octyl acrylate, and lauryl acrylate;
methacrylic acid esters having an alkyl group having 1 to 16 carbon atoms such as ethyl methacrylate, propyl methacrylate, butyl methacrylate, hexyl methacrylate, octyl methacrylate, and lauryl methacrylate;
acidic group-containing vinyl monomers such as acrylic acid, methacrylic acid, 2-acryloyloxyethyl succinate, 2-methacryloyloxyethyl succinate, carboxyethyl acrylate, and carboxyethyl methacrylate;
aromatic vinyl monomers such as styrene, benzyl acrylate, and benzyl methacrylate;

dienes such as 1,3-butadiene and isoprene; acrylonitrile; and the like. Among them, fatty acid vinyl esters, acrylic acid esters, and methacrylic acid esters are preferred, and vinyl acetates and ethyl acrylates are more preferred.

The resin A is preferably a resin having the structural unit (α) and other structural units, more preferably a resin having the structural unit (α) and a structural unit derived from at least one selected from the group consisting of fatty acid vinyl esters, acrylic acid esters, and methacrylic acid esters, and further preferably a resin having the structural unit (α) and a structural unit derived from vinyl acetates and/or ethyl acrylates.

The resin A may be used alone or in a mixture of two or more kinds thereof.

(Other Additives)

The adhesive layer may further contain other additives.

Examples of the other additives include viscosity modifiers dissolvable or swellable in water; binder adjuvants; anionic surfactants such as a sodium alkylbenzenesulfonate and an alkyl sulfosuccinate; nonionic surfactants such as a polyvinyl alcohol optionally having a sulfo group, a polyoxyethylene alkylphenyl ether, a polyoxyethylene alkyl ether, a polyoxyethylene fatty acid ester, a polyoxyethylene sorbitan fatty acid ester, and a polyoxyethylene-polyoxypropylene block copolymer; water-soluble polymers such as hydroxyethyl cellulose; powders of other organic compounds; ceramics such as alumina, silica, and zeolite; and the like. Anionic surfactants and nonionic surfactants are preferred, and nonionic surfactants are more preferred.

The occupancy area of the resin A in the adhesive layer is 10 to 80%.

The occupancy area of the resin means a ratio of an area in which the separator and the electrode are covered with a solid content containing the resin A. The occupancy area can be determined as follows. The bonded separator and electrode are separated from the adhesive layer as a boundary, and a surface of the separated separator is observed, for example, with a scanning electron microscope (SU1510, manufactured by Hitachi High-Technologies Corporation) and measured with image analysis software Image J (manufactured by National Institutes of Health).

The occupancy area is preferably 20 to 75%, more preferably 30 to 70%, further preferably 40 to 65%, and particularly preferably 50 to 60%. When the occupancy area is less than the range, the adhesion force is insufficient, and when it is more than the range, the internal resistance of a secondary battery tends to increase.

The adhesive layer contains the resin preferably in an amount of 0.001 to 1 $g/m^2$, more preferably in an amount of 0.01 to 1 $g/m^2$, and further preferably in an amount of 0.05 to 0.5 $g/m^2$. When the amount of the resin is less than the range, the adhesion force is insufficient, and when it is more than the range, the internal resistance of a secondary battery tends to increase.

In a case where the adhesive layer is formed on the separator, the change ratio between the air resistance of a separator having no adhesive layer and that of a separator having the adhesive layer is preferably 30% or less, more preferably 20% or less, and further preferably 10% or less.

<Layer>

The layer of the present invention (herein may be referred to as "the layer") contains a resin A having a structural unit derived from an α-olefin having 2 to 4 carbon atoms. The occupancy area of the resin A in the layer is 10 to 80%. Such a layer is used to bond a separator and an electrode to each other, and is on at least one surface selected from those of the separator and the electrode, and preferably on the surface of the separator. The adhesive layer is obtained by disposing the layer between the separator and the electrode, followed by bonding under pressure.

Examples of each of the separator, the electrode, and the resin A include those exemplified above. The layer may further contain other additives. Examples of the additives include those exemplified above.

The occupancy area of the resin in the layer is 10 to 80%.

The occupancy area of the resin means a ratio of an area in which the surface of the separator or the electrode is covered with a solid content containing the resin. The occupancy area can be determined as follows. The layer is formed on the outermost surface of the separator or the electrode, and the surface of the separator is observed, for example, with a scanning electron microscope (SU1510, manufactured by Hitachi High-Technologies Corporation) and measured with image analysis software Image J (manufactured by National Institutes of Health).

The occupancy area is preferably 12 to 70%, more preferably 14 to 60%, further preferably 16 to 50%, and particularly preferably 18 to 40%. When the occupancy area is less than the range, the adhesion force is insufficient, and when it is more than the range, the internal resistance of a secondary battery tends to increase.

The layer contains the resin preferably in an amount of 0.001 to 1 $g/m^2$, more preferably in an amount of 0.01 to 1 $g/m^2$, and further preferably in an amount of 0.05 to 0.5 $g/m^2$. When the amount of the resin is less than the range, the adhesion force is insufficient, and when it is more than the range, the internal resistance of a secondary battery tends to increase.

The thickness of the layer is preferably 0.005 to 100 μm, more preferably 0.005 to 20 μm, and further preferably 0.005 to 10 μm. When the thickness falls within the range, a large increase in the internal resistance of a secondary battery to be obtained tends to be suppressed. Therefore, this is preferred. When the thickness and the occupancy area both fall within the ranges, this tendency is further enhanced. Therefore, this is more preferred.

In a case where the layer is formed on the separator, the change ratio between the air resistance of a separator having no layer and that of a separator having the layer is preferably 30% or less, more preferably 20% or less, and further preferably 10% or less.

<Composition>

The composition of the present invention (herein may be referred to as "the composition") contains a resin A having a structural unit derived from an α-olefin having 2 to 4 carbon atoms, an organic solvent having a boiling point of 100 to 300° C., and water, and is used to bond a separator and an electrode to each other. The layer can be obtained by removing the organic solvent and water from the composition that is applied to the separator or the electrode, and the adhesive layer can be formed of the layer. The composition may further contain other additives such as a surfactant and an alcohol having a boiling point of lower than 100° C. as long as the adhesion performance between the separator and the electrode and the performance of a battery containing the adhesive layer are not largely decreased.

Examples of each of the separator, the electrode, and the resin A include those exemplified above. Examples of the other additives include those exemplified above.

The content of the resin A is generally 0.001 to 30 parts by mass, and more preferably 0.01 to 20 parts by mass with respect to the whole amount 100 parts by mass of the composition.

In a case where the composition contains the other additives, the content thereof is generally 0.1 to 10 parts by mass with respect to the whole amount 100 parts by mass of the composition.

The composition preferably contains a surfactant. In a case where the composition contains the surfactant, the content thereof is generally 0.001 to 100 parts by mass, and more preferably 1 to 100 parts by mass with respect to 100 parts by mass of the resin A.

(Water)

Water may be pure water, or contain impurities like tap water.

(Organic Solvent Having Boiling Point of 100 to 300° C.)

Examples of the organic solvent having a boiling point of 100 to 300° C. include alcohols such as 1-butanol, isobutyl alcohol, ethylene glycol, propylene glycol, and butanediol; saturated aliphatic ether compounds such as butyl ether, isobutyl ether, n-amyl ether, isoamyl ether, ethyl n-amyl ether, and ethyl isoamyl ether; unsaturated aliphatic ether compounds; aromatic ether compounds such as anisole, phenetole, phenyl ether, and benzyl ether; cyclic ether compounds such as dioxane; ethylene glycol ether compounds such as ethylene glycol monomethyl ether, ethylene glycol monoethyl ether, ethylene glycol monobutyl ether, diethylene glycol monomethyl ether, diethylene glycol monoethyl ether, and diethylene glycol monobutyl ether; monocarboxylic acid compounds such as formic acid, acetic acid, acetic anhydride, acrylic acid, propionic acid, and butyric acid; organic acid ester compounds such as butyl formate, amyl formate, propyl acetate, butyl acetate, amyl acetate, isoamyl acetate, 2-ethylhexyl acetate, cyclohexyl acetate, butylcyclohexyl acetate, ethyl propionate, butyl propionate, amyl propionate, butyl butyrate, diethyl oxalate, methyl lactate, ethyl lactate, butyl lactate, and triethyl phosphate; carbonate compounds such as propylene carbonate, ethylene carbonate, diethyl carbonate, ethylmethyl carbonate, 4-trifluoromethyl-1,3-dioxolan-2-one, and 1,2-di(methoxycarbonyloxy)ethane; nitrile compounds such as butyronitrile; amide compounds such as N,N-dimethylformamide, N,N-dimethylacetamide, and N-methylpyrrolidone; carbamate compounds such as 3-methyl-2-oxazolidone; ketone compounds such as methyl isobutyl ketone, diisobutyl ketone, acetylacetone, diacetone alcohol, cyclohexanone, cyclopentanone, methylcyclohexanone, and cycloheptanone; furfural, sulfolane, dimethyl sulfoxide, 1,3-propane sultone, and the like.

Among them, alcohols are preferred, 1-butanol, isobutyl alcohol, ethylene glycol, propylene glycol, and butane diol are more preferred, and 1-butanol is particularly preferred. The organic solvents may be used alone or in combination.

The content of the organic solvent having a boiling point of 100 to 300° C. is generally 0.01 to 100 parts by mass, and preferably 0.01 to 80 parts by mass with respect to 100 parts by mass of water.

(Alcohol Having Boiling Point of Lower than 100° C.)

Examples of the alcohol having a boiling point of lower than 100° C. include methanol, ethanol, 1-propanol, isopropyl alcohol, 2-butanol, and tert-butyl alcohol. Methanol, ethanol, 1-propanol, and isopropyl alcohol are more preferred, and 1-propanol and isopropyl alcohol are more preferred.

In a case where the composition contains the alcohol having a boiling point of lower than 100° C., the content thereof is generally 50 to 4,000 parts by mass, and preferably 200 to 3,000 parts by mass with respect to 100 parts by mass of the resin.

The solid content ratio of the composition is preferably 0.001 to 50% by mass, more preferably 0.001 to 30% by mass, and further preferably 0.001 to 20% by mass. The solid content ratio means a ratio of a component obtained by removing a volatile component having a boiling point of 300° C. or lower from the composition.

It is preferable that the composition be an emulsion. Specifically, it is preferable that a part or all of the resin A be dispersed as dispersoids in a dispersion medium containing an organic solvent having a boiling point of 100 to 300° C. and water. The number average particle diameter of the dispersoids is generally 0.005 to 100 µm, preferably 0.01 to 50 µm, more preferably 0.05 to 50 µm, further preferably 0.1 to 10 µm, and particularly preferably 0.3 to 2 µm. The particle diameter standard deviation of the dispersoids is generally 1 or less, preferably 0.6 or less, and more preferably 0.4 or less. The number of dispersoids having a particle diameter of less than 0.6 µm in the dispersoids is generally 90% or less, preferably 50% or less, more preferably 10% or less, further preferably less than 3%, and particularly preferably less than 1%. In a case where the number average particle diameter, the particle diameter standard deviation, and the ratio of dispersoids having a particle diameter of less than 0.6 µm fall within the ranges, the internal resistance of a secondary battery to be obtained does not largely increase.

The number average particle diameter, the particle diameter standard deviation, the number of dispersoids having a particle diameter of less than 0.6 µm can be measured, for example, with a laser diffraction particle size distribution measurement device (SALD-2200, manufactured by SHIMADZU CORPORATION).

(Method for Producing Composition)

The composition is obtained by mixing the resin A, the organic solvent having a boiling point of 100 to 300° C., water, and if necessary, an alcohol having a boiling point of lower than 100° C. and other components in any order. The resin A in a molten state may be dispersed in water, and the organic solvent having a boiling point of 100 to 300° C. may be mixed in the resultant mixture, or water may be added to a mixed solution of the resin A and the organic solvent having a boiling point of 100 to 300° C. with stirring. Alternatively, the organic solvent having a boiling point of 100 to 300° C. may be mixed in an emulsion of the resin A obtained by emulsion polymerization.

The emulsion polymerization is generally carried out by polymerization of an α-olefin having 2 to 4 carbon atoms with other monomers copolymerizable with the α-olefin in the presence of water. In this case, it is preferable that a surfactant acting as an emulsifier and a polymerization initiator be added. It is preferable that polymerization be carried out by adding the α-olefin having 2 to 4 carbon atoms, the other monomers copolymerizable with the α-olefin, and the polymerization initiator to a mixture of the surfactant and water, and heating the resultant mixture with stirring.

Further, a mixture of an emulsifier and water may contain a reductant. Examples of the reductant include sodium hydrogen sulfite, sodium thiosulfate, sodium pyrosulfite, rongalit, ferrous chloride, and the like.

Specifically, there is a method in which the reductant, the emulsifier, water, and if necessary, the α-olefin having 2 to 4 carbon atoms that is used in polymerization are placed in a pressure-resistant reactor, the inside of the reactor is then replaced with nitrogen, the reactor is pressurized at 5 to 150 atm, and the above materials are stirred at 10 to 80° C. while the residual α-olefin having 2 to 4 carbon atoms and the monomer copolymerizable with the α-olefin are sequentially added and an oxidizer in an aqueous solution state is sequentially supplied under pressure. Examples of the oxidizer include hydrogen peroxide, potassium persulfate, ammonium persulfate, and the like.

Examples of the surfactant acting as an emulsifier include anionic surfactants such as a sodium alkylbenzenesulfonate and an alkyl sulfosuccinate; nonionic surfactants such as polyvinyl alcohol optionally having a sulfo group, a polyoxyethylene alkyl phenyl ether, a polyoxyethylene alkyl ether, a polyoxyethylene fatty acid ester, a polyoxyethylene sorbitan fatty acid ester, and a polyoxyethylene-polyoxypropylene block copolymer; water-soluble polymers such as hydroxyethyl cellulose; and the like. Anionic surfactants and nonionic surfactants are preferred, and nonionic surfactants are more preferred.

Examples of the polymerization initiator include ammonium persulfate, potassium persulfate, sodium persulfate, 2,2'-azobis(4-methoxy-2,4-dimethylvaleronitrile), 2,2'-azobis(2,4-dimethylvaleronitrile), 2,2'-azobis(2-methylpropiononitrile), 2,2'-azobis(2-methylbutyronitrile), and the like.

<Laminate>

The laminate of the present invention (herein may be referred to as "the laminate") comprises the layer and a separator or an electrode, and is preferably composed of the layer and the separator.

Examples of each of the separator and the electrode include those exemplified above.

The air resistance of the laminate is generally 100 to 400 sec/100 mL, preferably 150 to 350 sec/100 mL, and further preferably 200 to 300 sec/100 mL.

(Method for Producing Laminate)

The laminate is generally produced by applying the composition to the separator or the electrode, and drying the composition to produce the layer on the surface of the separator or the electrode.

(Application)

The application area of the composition is preferably 5 to 100%. The application area means a ratio of an area in which the surface of the separator or the electrode is covered with the composition. The application area can be determined by observation with a microscope at a view field of 1 to 1,000 folds. A preferable application area in a state where the composition is approximately uniformly applied to the surface of the separator or the electrode (hereinafter may be referred to as "uniform application") is different from that in a state which includes a portion where the composition is applied to the surface of the separator or the electrode and a portion where the composition is not applied (hereinafter may be referred to as "discontinuous application"). Specific application areas are as follows.

In the case of the laminate obtained by uniform application, the application area of the composition with respect to the whole application surface of the separator or the electrode is preferably 30 to 100%, more preferably 50 to 100%, and further preferably 70 to 100%. In the uniform application, the composition in an emulsion state is preferably used.

In the case of the laminate obtained by discontinuous application, the application area of the composition with respect to the whole application surface of the separator or the electrode is preferably 5 to 80%, more preferably 10 to 70%, and further preferably 10 to 60%. In the discontinuous application, a homogeneous solution of the composition is preferably used.

Examples of the method of applying the composition to the separator or the electrode include a slot die coating method, a doctor blade method, a dip coating method, a reverse roll method, a direct roll method, a gravure method, a kiss coating method, an extrusion method, a bead coating method, a curtain coating method, a dot coating method, a porous coating method, a slot coating method, a spray coating method, a spiral spray coating method, a summit spray coating method, dipping, brush coating, and the like. Among the methods, any method can be used for the uniform application. Examples of the application method for the discontinuous application include a gravure method, a curtain coating method, a dot coating method, a porous coating method, a spray coating method, a spiral spray coating method, a summit spray coating method, and the like.

A doctor blade method, a gravure method, a kiss coating method, a curtain coating method, a dot coating method, a porous coating method, a slot coating method, a spray coating method, a spiral spray coating method, and a summit spray coating method are preferred, and a doctor blade method, a gravure method, a kiss coating method, a porous coating method, a spray coating method, a spiral spray coating method, and a summit spray coating method are more preferred.

(Drying Method)

It is preferable that the applied composition be further dried. Herein, "drying" means that the organic solvent and water are removed from the applied composition. Examples of the drying method include drying with warm air, hot air, or low moisture air; vacuum drying; drying by irradiation with (far) infrared ray, electron beam or the like. The drying temperature is preferably 30 to 200° C., and more preferably 40 to 100° C.

<Member for Secondary Battery>

The "member for a secondary battery" herein means a member in which an electrode and a separator are disposed with an adhesive layer interposed therebetween.

Figure 2:
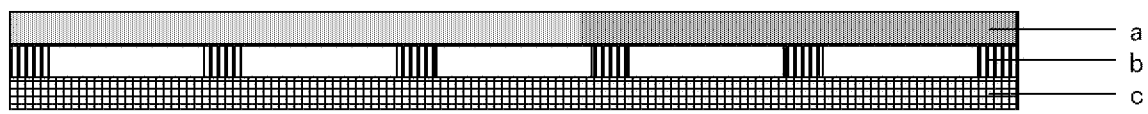
FIG. 2 is a schematic view illustrating a cross-sectional structure of a member for a secondary battery.
Figure 3:
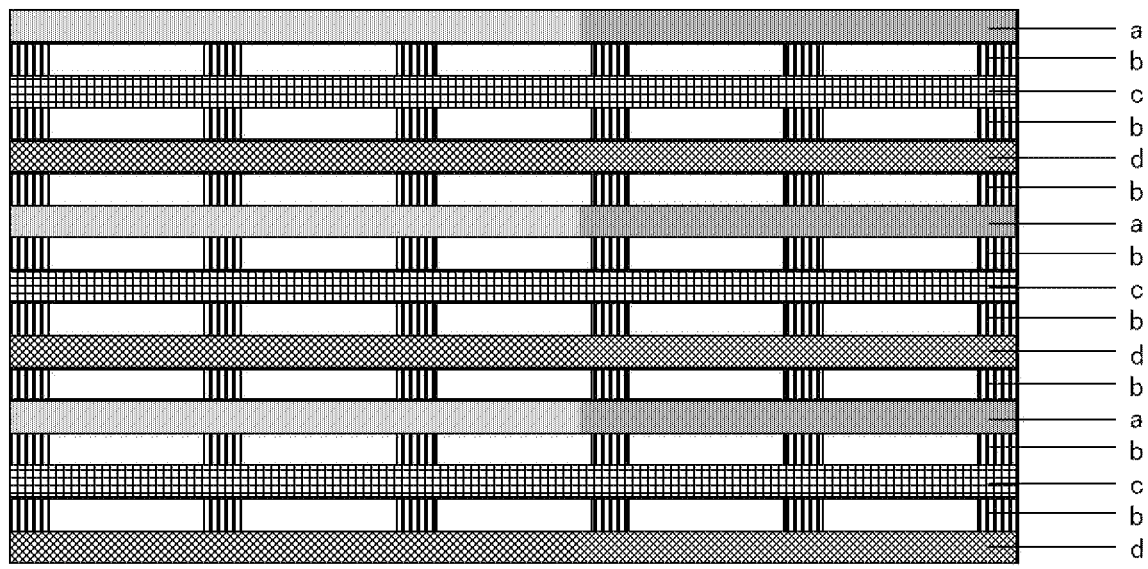
FIG. 3 is a schematic view illustrating a cross-sectional structure of the member for a secondary battery.

Examples of such a member for a secondary battery include a member in which a negative electrode, an adhesive layer, and a separator are disposed in this order (see FIG. 2); a member in which a positive electrode, an adhesive layer, and a separator are disposed in this order; a member in which a negative electrode, an adhesive layer, a separator, an adhesive layer, and a positive electrode are disposed in this order; and a member in which a plurality of negative electrodes, separators, and positive electrodes are each repeatedly disposed with an adhesive layer interposed therebetween in an order of the negative electrode, the separator, the positive electrode, and the separator (provided that two outermost surfaces are the negative electrode and the positive electrode; see FIG. 3).

In a member in which an electrode, an adhesive layer, and a separator are disposed in order, the peeling strength between the electrode and the separator is generally 0.1 to 50 N/m, preferably 0.5 to 30 N/m, more preferably 1 to 10 N/m, and further preferably 2 to 5 N/m.

<Method for Producing Member for Secondary Battery>

A first aspect of a method for producing a member for a secondary battery of the present invention comprises the following steps (a), (b), and (c):

(a) a step of applying a composition to a separator for a secondary batter;

(b) a step of drying the applied composition to obtain a laminate comprises a layer and the separator for a secondary battery; and (c) a step of bonding under pressure the layer and the electrode for a secondary battery to each other.

A second aspect of the method for producing a member for a secondary battery of the present invention comprises the following steps (a'), (b'), and (c'):

(a') a step of applying a composition to an electrode for a secondary battery;

(b') a step of drying the applied composition to obtain a laminate comprises a layer and the electrode for a secondary battery; and (c') a step of bonding under pressure the laminate and the separator for a secondary battery to each other.

In (a), (b), (a'), and (b') steps, the method of applying the composition and the method of drying the composition are each carried out by the above-described methods.

Bonding under pressure in (c) and (c') steps may be carried out by bonding under pressurization or by bonding under reduced pressure.

The temperature during bonding under pressure is generally 25° C. or higher, preferably 30° C. to 200° C., more preferably 40° C. to 150° C., and further preferably 50° C. to 120° C.

By bonding under pressure, a member for a secondary battery in which an adhesive layer is disposed between a separator and an electrode is obtained.

In order to obtain a member for a secondary battery in which a plurality of negative electrodes, separators, and positive electrodes are each disposed with an adhesive layer interposed therebetween as shown in FIG. 3, only the first aspect may be repeated, only the second aspect may be repeated, or the first and second aspects may be combined.

<Secondary Battery>

As an illustrative secondary battery having a member for a secondary battery and an electrolyte solution, a lithium-ion secondary battery will be described below. The lithium-ion secondary battery is a battery in which oxidation and reduction of lithium are carried out in both a positive electrode and a negative electrode, thereby storing and releasing electric energy.

(Electrolyte Solution)

Examples of the electrolyte solution used for the lithium-ion secondary battery include a non-aqueous electrolyte solution obtained by dissolving a lithium salt in an organic solvent, and the like. Examples of the lithium salt include mixtures of one or two or more kinds of $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, lower aliphatic carboxylic acid lithium salts, $LiAlCl_4$, and the like.

Among them, a lithium salt containing a fluorine atom is preferred, and at least one selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$ is preferred.

Examples of the organic solvent used for the electrolyte solution include carbonates such as propylene carbonate, ethylene carbonate, dimethyl carbonate, diethyl carbonate, ethylmethyl carbonate, 4-trifluoromethyl-1,3-dioxolan-2-one, and 1,2-di(methoxycarbonyloxy)ethane;

ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran;

esters such as methyl formate, methyl acetate, and γ-butyrolactone;

nitriles such as acetonitrile and butyronitrile;

amides such as N, N-dimethylformamide and N, N-dimethylacetamide; carbamates such as 3-methyl-2-oxazolidone;

sulfur-containing compounds such as sulfolane, dimethyl sulfoxide, and 1,3-propane sultone; and those obtained by introducing a fluorine substituent into the organic solvents, and two or more kinds of these solvents are generally used in admixture.

EXAMPLES

Hereinafter, the present invention will be described with reference to Examples, but the present invention is not limited to Examples above.

Example 1 (Production of Composition, Layer, and Laminate)

Ten parts by mass of isopropyl alcohol (boiling point: 82° C.) and 5 parts by mass of 1-butanol (boiling point: 117° C.) were added to a mixture of 1 part by mass of an ethylene-vinyl acetate copolymer (lowest film-forming temperature: 69° C.), 0.5 parts by mass of polyoxyethylene alkyl ether, and 83.5 parts by mass of water, and the resultant mixture was stirred for 5 minutes (at room temperature and 300 rpm) with a mechanical stirrer, to obtain a composition (1) in an emulsion state.

The composition (1) was analyzed with a laser diffraction particle size distribution measurement device (SALD-2200 manufactured by SHIMADZU CORPORATION). The number average particle diameter was 1.3 μm, the particle diameter standard deviation was 0.32, and the number of particles having a particle diameter of less than 0.6 μm was 4%.

The composition (1) was uniformly applied to porous polyethylene (separator) having a thickness of 19 μm and a porosity of 52% with a gravure coater (gravure method), and the resultant was dried by a dryer at 60° C., to obtain a laminate (1) having porous polyethylene and a layer. The layer contained the ethylene-vinyl acetate copolymer in an amount of 0.11 g/m$^2$. The occupancy area of the ethylene-vinyl acetate copolymer in the layer of the laminate was determined by observation with a scanning electron microscope (SU1510 manufactured by Hitachi High-Technologies Corporation, magnification: 5,000) and measured with image analysis software Image J (manufactured by National Institutes of Health), to be 18%.

Example 2 (Production of Composition, Layer, and Laminate)

A composition (2) was obtained in the same manner as in Example 1 except that the amount of the ethylene-vinyl acetate copolymer (lowest film-forming temperature: 69° C.) was changed to 5 parts by mass and the amount of water was changed to 78.5 parts by mass. A laminate (2) was obtained in the same manner as in Example 1 except that the composition (1) was changed to the composition (2).

Example 3 (Production of Composition, Layer, and Laminate)

Ten parts by mass of isopropyl alcohol and 5 parts by mass of 1-butanol were added to a mixture of 1 part by mass of an ethylene-ethyl acrylate-maleic anhydride copolymer, 0.5 parts by mass of polyoxyethylene alkyl ether, and 83.5 parts by mass of water, and the resultant mixture was stirred for 30 seconds (at room temperature and 2,000 rpm) using a rotation revolution mixer "Awatori Rentaro" (manufactured by THINKY CORPORATION; registered trademark), to obtain a composition (3) in an emulsion state.

The composition (3) was uniformly applied to porous polyethylene having a thickness of 16 μm and a porosity of 51% by a doctor blade method, and the resultant was dried at 65° C. for 5 minutes, to obtain a laminate (3) having porous polyethylene and a layer.

Example 4 (Production of Composition, Layer, and Laminate)

A laminate (4) having porous polyethylene and a layer was obtained by the same operation as in Example 3 except that 1 part by mass of an ethylene-ethyl acrylate-maleic anhydride copolymer was used.

Test Example 1 (Air Resistance)

The air resistances of the laminates (1) to (4), porous polyethylene having a thickness of 19 μm and a porosity of 52% (Reference Example 1), and porous polyethylene having a thickness of 16 μm and a porosity of 51% (Reference Example 2) were measured in accordance with JIS P8117. The results are shown in Table 1.

TABLE 1

| | | Air resistance [sec/100 mL] |
|---|---|---|
| Laminate (1) | Example 1 | 243 |
| Laminate (2) | Example 2 | 256 |
| Porous polyethylene | Reference Example 1 | 228 |
| Laminate (3) | Example 3 | 310 |
| Laminate (4) | Example 4 | 298 |
| Porous polyethylene | Reference Example 2 | 270 |

As the air resistance of the laminate is higher, the internal resistance of a secondary battery to be obtained using the laminate increases. However, no significant difference was recognized between the air resistance of the laminate and the air resistance of porous polyethylene alone. Therefore, the internal resistance of a secondary battery to be produced using the laminate does not largely increase.

Example 5 (Production of Adhesive Layer)

Release paper cut into a strip was overlapped onto the layer of the laminate (1), both materials were thermally bonded under pressure at 70° C. by reciprocating a roll type laminator (FUJI Lamipacker LPP6512 manufactured by FUJIPLA Inc.) 4 times, and then separated, to obtain porous polyethylene having an adhesive layer. The adhesive layer was observed with a scanning electron microscope (SU1510 manufactured by Hitachi High-Technologies Corporation) at a magnification of 3,000 and measured with image analysis software Image J (manufactured by National Institutes of Health). The occupancy area of the ethylene-vinyl acetate copolymer in the adhesive layer was 56%.

The release paper simulated an electrode for a secondary battery. The release paper was used to facilitate separation from the porous polyethylene and easily analyze the adhesive layer. The occupancy area of the ethylene-vinyl acetate copolymer in the adhesive layer produced using the release paper is assumed to be the same as in a case where an electrode for a secondary battery is used instead of the release paper.

Reference Example 3

Porous polyethylene having a thickness of 19 μm and a porosity of 52% was heat-treated at 70° C. by reciprocating a roll type laminator (FUJI Lamipacker LPP6512 manufactured by FUJIPLA Inc.) 4 times in the same manner as in Example 5, to obtain heat-treated porous polyethylene.

Test Example 2 (Air Resistance)

The air resistances of the porous polyethylene having the adhesive layer and the heat-treated porous polyethylene were measured in accordance with JIS P8117. The results are shown in Table 2.

TABLE 2

| | | Air resistance [sec/100 mL] |
|---|---|---|
| Porous polyethylene having adhesive layer | Example 5 | 266 |
| Heat-treated porous polyethylene | Reference Example 3 | 242 |

As the air resistance of the separator is higher, the internal resistance of a secondary battery to be obtained using the separator increases. However, no significant difference was recognized between the air resistance of the porous polyethylene having the adhesive layer and the air resistance of heat-treated porous polyethylene having no adhesive layer. Therefore, the internal resistance of a secondary battery having the adhesive layer does not largely increase.

Example 6 (Production of Member for Secondary Battery)

A negative electrode cut into a strip [a commercially available negative electrode produced by applying graphite/styrene-1,3-butadiene copolymer/sodium carboxymethyl cellulose (weight ratio: 100/1.5/1) to a copper foil] was overlapped onto the layer of the laminate (1), both materials were thermally bonded under pressure at 70° C. by reciprocating a roll type laminator (FUJI Lamipacker LPP6512 manufactured by FUJIPLA Inc.) 4 times, to obtain a member for a secondary battery (1), the member having the porous polyethylene, the adhesive layer, and the negative electrode in order.

Example 7 (Production of Member for Secondary Battery)

A member for a secondary battery (2), the member having porous polyethylene, an adhesive layer, and a negative electrode in order was obtained by the same operation as in Example 6 using the laminate (2).

Example 8 (Production of Member for Secondary Battery)

A member for a secondary battery (3), the member having porous polyethylene, an adhesive layer, and a negative electrode in order was obtained by the same operation as in Example 6 using the laminate (3).

Example 9 (Production of Member for Secondary Battery)

A member for a secondary battery (4), the member having porous polyethylene, an adhesive layer, and a negative electrode in order was obtained by the same operation as in Example 6 using the laminate (4).

Reference Example 4

Porous polyethylene having a thickness of 19 μm and a porosity of 52% and a negative electrode cut into a strip [a commercially available negative electrode produced by applying graphite/styrene-1,3-butadiene copolymer/sodium carboxymethyl cellulose (weight ratio: 100/1.5/1) to a copper foil] were overlapped, and both materials were thermally bonded under pressure at 70° C. by reciprocating a roll type laminator (FUJI Lamipacker LPP6512 manufactured by FUJIPLA Inc.) 4 times, to obtain a member for a secondary battery (5).

Test Example 3 (Peeling Strength)

A surface of each of the members for a secondary battery (1) to (5) on an electrode side and a glass epoxy resin plate were pasted with a double-sided adhesive tape to prepare a sample for measurement. The sample for measurement was fixed on a peeling strength measurement device, and peeled toward the thickness direction using a small bench-top testing machine (EZ Test EZ-L manufactured by SHIMADZU CORPORATION), and the magnitude of force necessary for peeling the electrode and the porous polyethylene included in the member for a secondary battery was measured. A value obtained by dividing the magnitude of force in this operation by the width (2 cm) of the porous polyethylene included in the member for a secondary battery was set as the peeling strength (N/m). The results are shown in Table 3.

TABLE 3

| | | Peeling Strength [N/m] |
|---|---|---|
| Member for secondary battery (1) | Example 6 | 5 |
| Member for secondary battery (2) | Example 7 | 23 |
| Member for secondary battery (3) | Example 8 | 2 |
| Member for secondary battery (4) | Example 9 | 1 |
| Member for secondary battery (5) | Reference Example 4 | Not adhesion, and unmeasurable |

The members for a secondary battery were sufficiently high in peeling strength, and therefore workability in assembly of a secondary battery is improved.

Reference Example 5

After the member for a secondary battery obtained in Example 6 is dried under vacuum, in a coin cell of CR2032 type (according to IEC/JIS), the member for a secondary battery, a lithium foil as a positive electrode, and a mixed solvent of $LiPF_6$/ethylene carbonate and diethyl carbonate having a concentration of 1.0 mol/liter as an electrolyte solution are used and a bipolar cell is assembled.

Reference Example 6

A bipolar cell is assembled in the same manner as in Reference Example 5 except that the member for a secondary battery obtained in Example 7 is used instead of the member for a secondary battery obtained in Example 6.

Reference Example 7

A bipolar cell is assembled in the same manner as in Reference Example 5 except that the member for a secondary battery obtained in Example 8 is used instead of the member for a secondary battery obtained in Example 5.

Reference Example 8

A bipolar cell is assembled in the same manner as in Reference Example 5 except that the member for a secondary battery obtained in Example 9 is used instead of the member for a secondary battery obtained in Example 5.

INDUSTRIAL APPLICABILITY

According to the adhesive layer of the present invention, a separator for a secondary battery and an electrode for a secondary battery included in a member for a secondary battery can be bonded to each other with sufficient strength, and workability in assembly of a secondary battery can be improved.

DESCRIPTION OF REFERENCE NUMERALS a: negative electrode
b: adhesive layer of the present invention
c: separator
d: positive electrode

The invention claimed is:

1. An adhesive layer disposed between a separator for a secondary battery and an electrode for a secondary battery, wherein
    the adhesive layer is obtained by bonding under pressure a layer containing a resin having a structural unit derived from an α-olefin having 2 to 4 carbon atoms, and
    an occupancy area of the resin in the adhesive layer is 10 to 80%,
    the adhesive layer further comprising a nonionic surfactant,
    the nonionic surfactant being a polyvinyl alcohol optionally having a sulfo group, a polyoxyethylene alkylphenyl ether, a polyoxyethylene alkyl ether, a polyoxyethylene fatty acid ester, a polyoxyethylene sorbitan fatty acid ester, and/or a polyoxyethylene-polyoxypropylene block copolymer, and
    the adhesive layer contains the resin having a structural unit derived from an α-olefin having 2 to 4 carbon atoms in an amount of 0.05 $g/m^2$ or more and less than 0.11 $g/m^2$.

2. The adhesive layer according to claim 1, wherein the resin having a structural unit derived from an α-olefin having 2 to 4 carbon atoms has a lowest film-forming temperature of 40 to 150° C.

* * * * *